United States Patent [19]

Fussell

[11] Patent Number: 5,014,813
[45] Date of Patent: May 14, 1991

[54] WATER-PROOF GEOPHONE HOUSING

[76] Inventor: Don L. Fussell, 16818 Bobcat, Cypress, Tex. 77429

[21] Appl. No.: 290,513

[22] Filed: Dec. 27, 1988

[51] Int. Cl.⁵ .............................................. G01V 1/06
[52] U.S. Cl. .................................. 181/122; 367/178; 367/188; 29/594; 264/250; 264/272.16
[58] Field of Search ............... 181/122; 367/157, 165, 367/177, 178, 188; 174/74 A, 74 R, 76, 84 R; 264/250, 263, 272.16; 29/594

[56] References Cited

U.S. PATENT DOCUMENTS

| | | | |
|---|---|---|---|
| 3,322,885 | 5/1967 | May et al. | 174/76 |
| 3,866,162 | 2/1975 | Florian | 174/54 |
| 3,885,087 | 5/1975 | Takada et al. | 174/76 |
| 3,932,834 | 1/1976 | Sutherland | 181/122 |
| 4,438,292 | 3/1984 | Woodall | 367/188 |
| 4,470,134 | 9/1984 | McNeel | 367/188 |
| 4,594,698 | 6/1986 | Heffer | 367/188 |
| 4,684,202 | 8/1987 | House et al. | 264/263 X |

Primary Examiner—Brian S. Steinberger
Attorney, Agent, or Firm—Dodge, Bush & Moseley

[57] ABSTRACT

In accordance with an illustrative embodiment of the present invention, a water-proof geophone housing assembly includes a lower body member housing a seismic transducer, a cap member closing the upper end of the lower body member, an upper body member molded over the cap member and an upper portion of the lower body member, there being a molecular bond between all confronting surfaces of the members to prevent entry of moisture. The electrical lead wires extending from the transducer through the cap member and upwardly out of the upper body member are water blocked to prevent migration of water therealong.

18 Claims, 1 Drawing Sheet

U.S. Patent        May 14, 1991        5,014,813
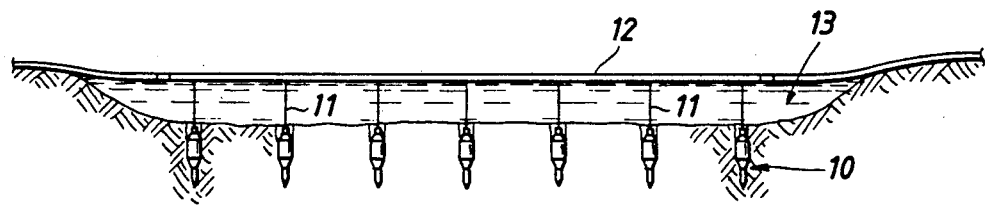
FIG.1
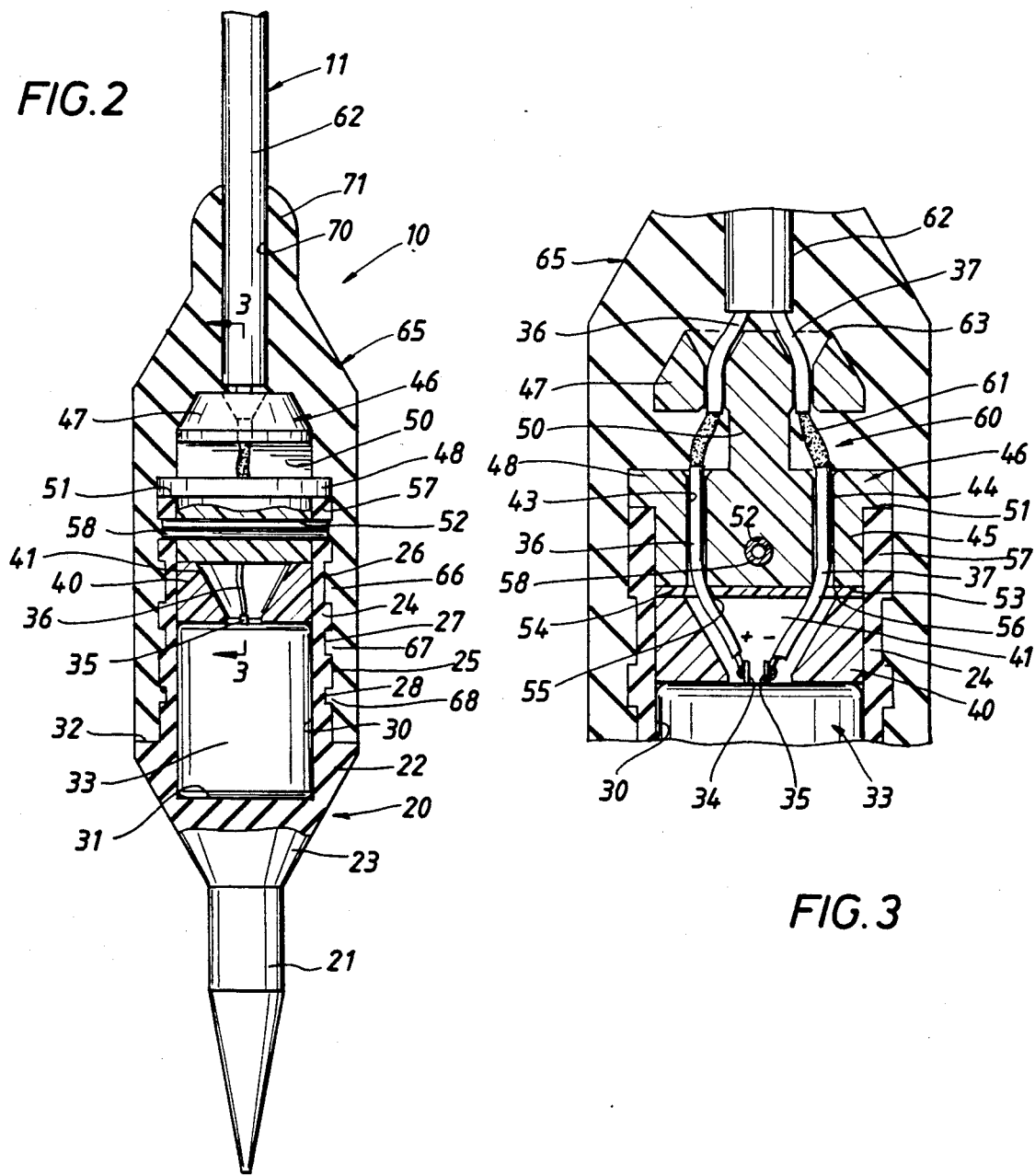
FIG.2
FIG.3

WATER-PROOF GEOPHONE HOUSING

FIELD OF THE INVENTION

This invention relates in general to geophone housings, and particularly to a new and improved moisture-proof geophone housing assembly that can be implanted in a marshy area of the earth's surface for detecting seismic acoustic waves.

BACKGROUND OF THE INVENTION

The typical marsh-type geophone has a plastic, generally tubular hollow body with a metal spike on its lower end and a cap threaded onto its upper end. The cap has a central opening through which a jacketed cable having a pair of conductor wires extends, and the wires are connected to the terminals of an acoustic wave transducer that is mounted within the hollow body. A rubber washer that surrounds the cable jacket is placed in compression as the cap is threaded onto the upper end of the body, with the aim of deforming the washer into sealing engagement between the cable jacket and the walls of the housing to prevent water from leaking into the region of the geophone terminals.

Even though the compression gland packing element may function initially to prevent water from entering along the exterior of the cable jacket, there still remains the risk that the jacket may be cut so that water can enter the jacket and migrate along the conductor wires to the interior of the housing. If the cut also extends through the insulation of a conductor wire, water can migrate along the interstices between wire strands and eventually reach the phone connections. With time, the lead wire under the rubber washer also can take a permanent set and lose the compression that is necessary to prevent leakage. Regardless of how the water gets through, the result is electrical shorting which spoils the output signals of the phone. In marsh areas, the water usually has a high salt content which quickly causes corrosion of the connections as well.

The general object of the present invention is to provide a new and improved geophone housing structure that is totally water blocked so that moisture can not enter the interior of the housing, either between housing parts or along conductor wires, so as to be particularly suitable for use in marshy areas of the earth's surface.

Another object of the present invention is to provide a new and improved method of water blocking and bonding stranded conductor wires with respect to an insulation such that moisture can not migrate along the wire strands.

Another object of the present invention is to provide a new and improved marsh-type geophone assembly that is very rugged and not subject to breakage during use or handling.

SUMMARY OF THE INVENTION

These and other objects are attained in accordance with the present invention through the provision of a geophone housing assembly including a lower housing member defining an open-topped internal cavity adapted to receive a seismic wave transducer, a cap member closing the upper end of the cavity and having vertically extending lead wire passages, and an upper housing or body member that is injection molded, using a relatively flexible elastomer, over the cap member and an upper portion of the lower member. The lower housing member and the cap member are made of a relatively rigid elastomer material so that homogenous molecular bonds are formed between all confronting surfaces of the members to prevent entry of moisture. Such bonding also occurs between surfaces of the upper housing member, the cap and the lower housing member.

The electrical leads from the transducer terminals each have a section of their insulation removed in the vicinity of the cap member, and the strands of each lead are spread apart to widen the interstices therebetween substantially throughout the lengths of such sections. A water-blocking substance such as solder is used to fill the widened interstices, so that when the upper body member is injection molded onto the assembly, the upper body member material bonds to the solder to prevent migration of any water along the strands, either internally or externally.

The insulated leads above the water block extend into the lower end of the jacket of a drop line by which the transducer is electrically coupled to a surface seismic cable. The lower portion of such jacket is terminated so as to extend into the upper portion of the upper body member. In this manner the upper body member also bonds to the exterior of the jacket portion to prevent entry of water therebetween.

It will be recognized that the geophone assembly of the present invention is totally moisture-proof as disclosed herein. If the cable jacket were to be cut or otherwise experience a holiday for any reason, any water tending to migrate along the pair of insulated conductor wires will be blocked in the upper portion of the upper body member. If the cut extends through the insulation of one or more of the conductors, the water block of the strands will prevent migration therethrough. The molecular bonding of the body and cap member interfaces prevent leakage into the transducer cavity. Thus the present invention is uniquely totally water-proof in a highly desirable manner.

The present invention has other objects, features and advantages that will become more clearly apparent in connection with the following detailed description of a preferred embodiment, taken in conjunction with the various figures of the appended drawings.

BRIEF DESCRIPTION OF THE DRAWINGS

FIG. 1 is a schematic view; of a group of marsh-type geophones suspended on drop lines from a trunk line, which is attached to a seismic cable;

FIG. 2 is a cross-section view of a geophone assembly in accordance with this invention; and FIG. 3 is an enlarged, fragmentary view of a standed conductor that has been water-blocked in accordance with the invention.

DESCRIPTION OF A PREFERRED EMBODIMENT

Referring initially to FIG. 1, a group of six geophones 10 are shown suspended on drop lines 11 from a trunk line 12 which extends along the surface of a body of shallow water 13 such as a marsh, commonly found, for example, in the southern coastal regions of the State of Louisiana. Each drop line 11 has a pair of insulated conductor wires inside a protective jacket, and the lower end of the wires are connected to the respective terminals of an acoustic wave transducer that is housed in each geophone body. In a typical arrangement, a group of six phones are suspended on the drop lines 11 which are spaced about 30 feet apart, so that the trunk line 12 is in the order of 180 feet long. Of course a sufficient number of the trunk line sections can be connected end-to-end so that the array will reach completely across the marsh along a predetermined survey line.

The respective geophone assemblies 10 are implanted in the earth below the water bottom by a crewman who, working from the deck of a small boat, uses a fiberglass pole or the like to shove the phone assemblies into the mud at the water bottom. Each phone assembly has a spike on its bottom end, as will be described below, to aid in implanting the assembly 10 in the vertical position. Of course the phone group can contain more or less than six assemblies, and the spacing mentioned above can be varied. Although the phones 10 are usually connected in series, other electrical configurations can be used, depending upon how one choses to design the array.

As shown in FIG. 2, each geophone assembly 10 includes a lower body 20 that is formed with an integral spike 21 on its lower end, there being a frusto-conical body section 22 above the spike which has a downward and inwardly inclined outer surface 23. Preferably, the lower body 20 is formed by an injection molding process, using a relatively rigid synthetic elastomer material. The upper portion 24 of the lower body 20 has a reduced diameter outer surface 25 that is formed with a plurality of external annular recesses 26-28. A cylindrical, open-topped cavity 30 is provided inside the body 20, and has a lower wall surface 31 located somewhat below the level of the upper surface 32 of conical body section 22.

A typical geophone transducer assembly 33 is mounted within the cavity 30 and rests on the bottom wall surface 31. The phone 30 has positive and negative terminals 34, 35 on its upper end which are electrically connected to insulated lead wires 36, 37. The wires 36, 37 extend upward through an aperture in the lower surface of a neoprene spacer washer 40 and through an upwardly facing conical recess 41 in the central portion thereof. From the recess region 41 the leads 36, 37 extend through respective vertical passages 43, 44 formed in the lower section 45 of a cap member 46.

The cap member 46, which is formed of the same material as the lower body 20, has a frusto-conical dome 47 that is joined to a circular flange 48 by a diametrically extending wall 50. The flange 48 has substantially the same outer diameter as the upper portion 24 of the lower body 20, and the outer periphery of the flange rests on the upper end surface 51 of the portion 24. The lower section 45 of the cap member 46 has a reduced diameter as shown, so as to fit snugly inside the upper portion of the body section 24. The lower section 45 has a lower surface 53 that is bonded to a thin insulation disc 54 having a pair of holes 55 that are aligned with the vertical passages 43, 44, and through which the leads 36, 37 extend. The parts have vertical height dimensions such that when the flange 48 abuts the top surface 51 of the body 24, the neoprene washer 40 is slightly compressed so that the inherent resilience thereof presses the phone assembly 33 downward to hold it against movement within the cavity 30.

A transverse hole 52 in the lower section 45 of the cap member 46 mentioned above is arranged for transverse alignment with apertures formed in the upper section 57 of the body portion 24 when the washer 40 is slightly compressed as aforesaid. A device such as suitable roll pin 58 then is inserted to retain the parts assembled. As seen in FIG. 2, the upper end portions of the passages 43, 44, and the holes 55 in the disc 54, can be chamfered so as to preclude the presence of any sharp edges that might damage the insulation jackets of the respective conductor wire leads 36, 37.

As shown in enlarged detail in FIG. 3, a section of the jacket of each lead 36, 37 is removed in the region 60 between the lower face of the dome 47 and the upper face of the flange 48. A suitable instrument or tool is used to spread apart the strands of each conductor in the region 60, after which a section of solder 61 is used to fill the interstices between the strands substantially throughout the vertical length of the region 60. The solder 61 serves to totally block any migration of water along the strands of the conductors.

The insulated conductors 36, 37 extend upward into the jacket 62 of a respective drop wire, the jacket being cutaway closely adjacent the upper end surface 63 of the dome 47 of the cap member. As the final step in the assembly of the present invention, an upper body portion 65 of a more flexible elastomer material than the lower body 20 is injection molded onto the lower body 20 in the shape as shown, so that it has inner annular ribs 66-68 that fill the recesses 26-28 on the exterior of the body portion 24. During the injection molding process, a molecular bond is formed between all confronting surfaces of the body portions 24 and 65 and of the body portion 65 and the cap member 46. The material also flows into the regions 60 of the cap member 46, and totally fills all void space therein. The material bonds to the solder 61 which fills the interstices of the strands. A molecular bond also is formed between the inner surface 70 of the stress relief hub 71 at the top of the upper body portion 65 and the outer surface of the jacket 62 of the drop wire. Thus it will be apparent that the geophone assembly is totally water-blocked against entry of any moisture which could otherwise reach the phone terminal connections 34, 35 and degrade or prevent electrical signal transmission from the phone.

OPERATION

Each geophone structure 10 is made using the assembly and injection molding techniques described above, and each drop line 11 is electrically and mechanically connected to the trunk line 12 by a suitable "T" takeout arrangement (not shown). The completed assembly is laid out across a marsh area, and each phone 10 is let down into the water and shoved into the bottom by a fiberglass pole or the like to a depth such that the phone is implanted in relatively stable and compacted soil. Any number of assemblies can be coupled end-to-end in order to span a marsh, and in the example disclosed herein an array of six geophones are electrically connected in series to a pair of signal conductor wires that extend through the trunk line 12 back to a seismic cable, and a data processing and recording station.

A seismic source is activated which produces acoustic waves that travel downward through the earth. At levels where there exists a significant impedance difference between the materials of adjacent earth strata, for example different types of rocks, acoustic waves are reflected upward toward the surface. When reflected waves arrive at the geophones, the slight movement of the earth particles in which the geophone is implanted is detected by the phone assembly, which produces an electrical output signal. The time interval between source actuation and acoustic wave arrival can be used in a conventional manner to determine the depth in the earth at which the waves were reflected, thereby permitting a stratographic map to be made of the layers of the earth underlying the seismic detectors.

Where a geophone is used in an environment where water is present, the problem of keeping the water out of the interior of the phone assemblies is always presented. The present invention solves that problem by (1) providing a geophone case that is a homogenous mass which does not rely on a packing gland to prevent water entry, (2) totally water-blocking the electrical conductors that lead into and from the phone case so that water can not migrate along the conductors even though it might have entered a rupture, cut or tear in a conductor jacket located away from the phone assembly, and (3) providing molecular bonding between phone component and conductor jacket interfaces that is totally leakproof.

Since certain changes or modifications may be made in the disclosed embodiment without departing from the inventive concepts involved, it is the aim of the appended claims to cover all such changes and modifications falling within the true spirit and scope of the present invention.

What is claimed is:

1. A seismic transducer housing assembly, comprising: upper and lower body members each made of an elastomeric material, said lower body member defining an internal cavity that is adapted to house a seismic transducer; a cap member located within said upper member and engaging said lower member to close the top of said cavity, said cap member being made of the same material as said upper and lower body members and having passage means; and conductor means extending through said passage means toward said seismic transducer, said upper body member being injection molded over said cap member and having a lower portion that is injection molded over an upper portion of said lower body member to provide a molecular bond at the interfaces between said upper housing member and said cap member and between said portions which prevents leakage of water into said cavity.

2. The assembly of claim 1 wherein said conductor means includes a pair of insulated, stranded electrical conductors surrounded by a protective elastomer sheath extending into said upper body member and through said passage means of said cap member, said conductors being adapted to be connected to respective terminals of said seismic transducer; and means for blocking the interstices of the strands of said conductors against migration of water therealong.

3. The assembly of claim 2 wherein a molecular bond is formed at interfaces of said one body member and said sheath to prevent leakage of water through such interfaces.

4. The assembly of claim 1 wherein said cap member has a dome connected to an annular flange by a transverse wall, said passage means extending vertically through said dome and said flange on opposite sides of said walls whereby said conductor means extend through initially void regions to the sides of said walls, said upper body member having portions filling said regions as a result of the injection molding of said upper body member over said cap member.

5. The assembly of claim 4 wherein each of said conductor means includes wire strands encased in an insulation material, a length of such insulation material that is substantially coextensive with said regions being removed, and water blocking means filling the interstices of said strands where said insulation material has been removed.

6. The assembly of claim 5 when said water blocking means is a solder, adjacent surfaces of said upper body member bonding to said solder to prevent fluid leakage.

7. The assembly of claim 1 further including outwardly projecting spike means formed on the lower end of said lower body member as a unitary portion thereof.

8. The assembly of claim 7 further including resilient means in said cavity for preventing movement of a seismic transducer mounted in said cavity relative to said lower body member.

9. A geophone housing assembly comprising: a lower body member having an open-topped cavity therein adapted to receive a seismic transducer; a cap member for closing the open upper end of said cavity, said cap member having passages therethrough; insulated conductor wires extending through said passages to said transducer; an upper housing member enclosing said cap member and having a lower portion overlapping an upper portion of said lower housing member, said lower and upper housing members and said cap member being made of a relatively rigid elastomer, said upper housing member being injection molded over said cap member and said upper portion of said lower housing member whereby a molecular bond is provided at interfaces of said members to prevent entry of moisture into said cavity.

10. The assembly of claim 9 further including means for water blocking said insulated conductors to prevent migration of water internally thereof.

11. The assembly of claim 10 wherein said upper and lower portions of said body members have interengaged annular ridges and recesses.

12. The assembly of claim 11 further including resilient spacer means positioned between said cap member and said transducer, said resilient spacer means being placed in compression when said cap member closes said cavity to prevent relative movement of said transducer within said cavity; and means for fixing said cap member to said lower body member to retain said spacer means in compression.

13. The assembly of claim 9 wherein said lower body member has an outwardly projecting spike on the lower end thereof formed as a unitary part thereof.

14. The assembly of claim 10 wherein said cap member has an upper dome and a lower flange joined together by a transverse wall, there being initially void regions on opposite sides of said wall, said conductor wires extending across said void regions, said void regions being filled by portions of said upper body member during injection molding thereof.

15. The assembly of claim 14 wherein each of said conductor wires comprises internal strands covered by a layer of insulation, a section of such insulation layer being removed where said conductor wires cross said initially void regions, and water blocking means filling the interstices between said strands in said sections.

16. The assembly of claim 15 wherein said water blocking means is a solder, said portions of said upper body member bonding to said solder.

17. A method of making a waterproof geophone housing comprising the steps of: molding a lower housing member having a cylindrical upper portion that defines an internal cylindrical cavity; positioning a seismic transducer in said cavity having a pair of electrical leads extending upwardly therefrom; positioning a cap member on said upper portion to enclose said cavity and transducer, said leads passing upward through said cap member; and injection molding an upper housing member over said cap member and said upper portion of said lower body member, said lower housing member, said cap member and said upper housing member being formed of an elastomer whereby molecular bonds are formed between all confronting surfaces of said members which prevent entry of moisture into said cavity.

18. The method of claim 17 including the further step of water blocking said electrical leads prior to the injection molding of said upper body member.

* * * * *